March 5, 1940.  G. D. STORRS  2,192,419
NONSKID DEVICE FOR TIRES
Filed March 30, 1938   2 Sheets-Sheet 1
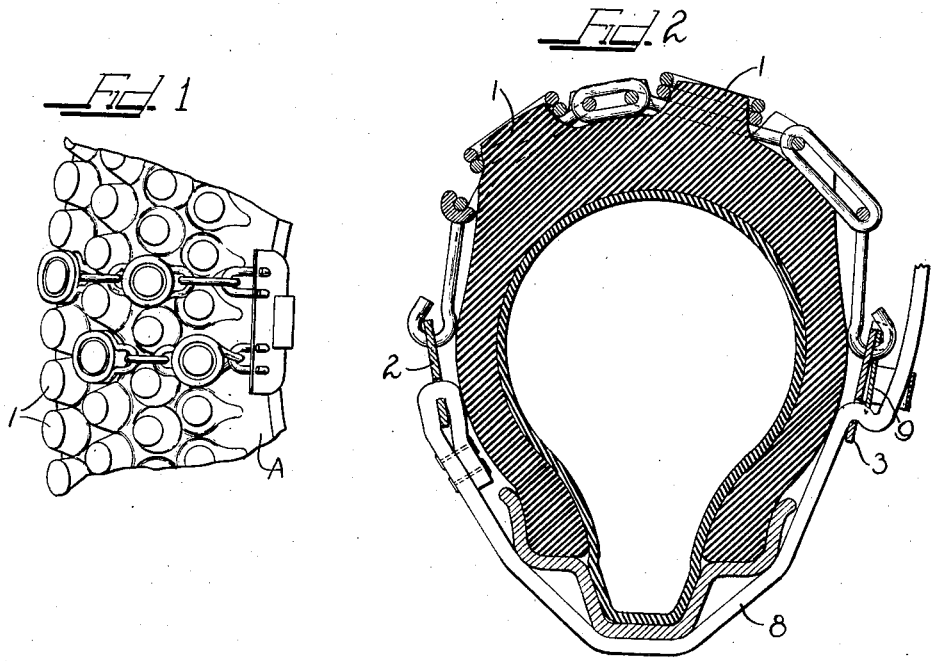
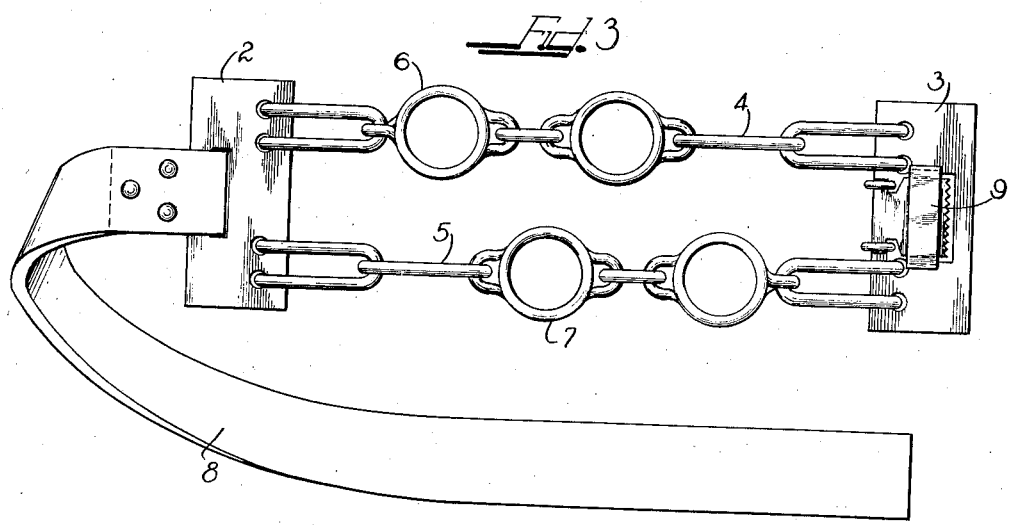
Inventor
GEORGE D. STORRS

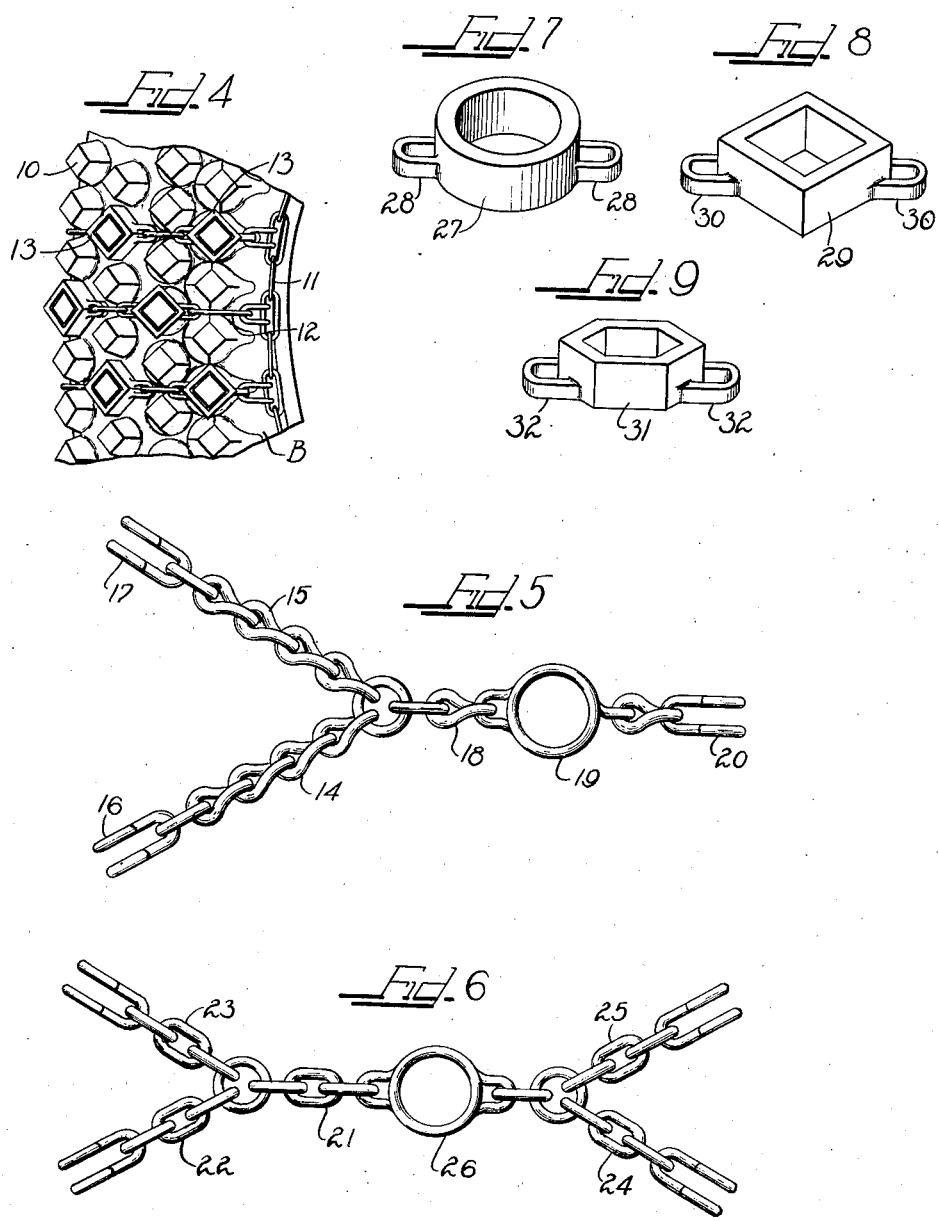

Patented Mar. 5, 1940

2,192,419

UNITED STATES PATENT OFFICE 2,192,419

NONSKID DEVICE FOR TIRES

George D. Storrs, Eau Claire, Wis., assignor to Gillette Rubber Company, Eau Claire, Wis., a corporation of Wisconsin Application March 30, 1938, Serial No. 198,802

4 Claims. (Cl. 152—237)

The present invention relates to a non-skid device for tires, and more particularly to tire chain construction for use with automotive vehicle tires having individually separated calk projections or other configurations formed as a part of the tire tread, and constituting studs or calks for traction purposes, and to a tire chain construction in which provision is made in cross chains to fit about and receive certain of said projections, together with means for temporarily applying the chain to the tire or to any portion of the same.

It is old to use tire chains on automobile tires to afford increased traction while driving in snow, mud, sand or the like. However, with the tire chains as at present constructed, sometimes when the wheels encounter rough going they spin inside the chains, the chains slipping relatively to the tires without affording any traction effect.

The present invention is concerned with a tire chain construction having cross chains with certain parts or portions shaped to fit about protruding parts of the tire tread, studs, calks or other configurations, thereby anchoring the chains against creeping and at the same time reinforcing such encompassed projections as to increase the tractive effect of the tire. Any deformation of the projections occurring under weight of the vehicle, tends to spread such projections into tight engagement with such chain parts and thereby increase the effectiveness of the chain for traction purposes.

An object of the present invention is to provide a novel non-skid device for tires which may be readily applied and removed, and which is fashioned to make engagement with certain protuberances on the tires to prevent relative movement between the chains and tires.

Another object of the present invention is to provide a non-skid device for application to rubber tires for temporarily adding metal protection to certain of the configurations of the tire tread thus offering metal surfaces at the points of contact between the projections and the road, to oppose any tendency of the vehicle to skid.

A further object of the invention is to provide a non-skid device for tires which remains in a fixed position on the tire surface, thereby increasing the positive tractive and non-skidding effect of the tire by becoming, while attached, a part of the tire.

A still further object of the present invention is to provide a non-skid device for tires of such character as to eliminate substantially all of the vibration incidental to a vehicle equipped with tire chains, especially when operating over hard surface roads.

The invention has for a further object the provision of a tire chain so constructed with parts engaging loosely over certain of the configurations of a tire tread as to reinforce such configurations and prevent against skid, and connecting the portions in such manner as to prevent displacement from the tire while in use.

Generally speaking, the invention contemplates a tire chain including a cross link having parts shaped to encompass certain protuberances or projections on the tire tread, to armor such protuberances, together with means for maintaining the chain in place on the tire.

The above, other and further objects of the present invention will be apparent from the following description and accompanying drawings.

The accompanying drawings illustrate embodiments of the present invention, and the views thereof are as follows:

Figure 1 is a fragmental portion of a tire having configurations on its tread surface, the configurations being illustrated as in the form of truncated cones, with a cross chain of the present invention thereto applied.

Figure 2 is a cross sectional view of a tire and rim, the tire having protuberances on its tread, and with a tire chain of the present invention thereto applied.

Figure 3 is a plan view of the embodiment of the invention illustrated in Figures 1 and 2.

Figure 4 is a view similar to Figure 1 showing a tire having protuberances or projections of a different configuration.

Figure 5 is a plan view of a portion of another form of cross link construction adapted to be supported on the tire by the usual side chains engaging the wall portions of the tire.

Figure 6 is a plan view of another form of the invention of the character illustrated in Figure 5.

Figures 7, 8 and 9 are perspective views of parts of different shapes to conform to differently shaped protuberances or projections on tires.

The drawings will now be explained:

A fragmental section of a tire A is illustrated in Figure 1 having its tread portion provided with a plurality of protuberances or projections 1 which are illustrated as truncated cones.

Illustrated in Figure 3 is a plan view of one form of the invention, comprising plates 2 and 3 adapted to be placed against the side walls of a tire, which plates are connected by linkage 4 and 5, providing two cross members, in which linkage are portions 6 and 7 respectively shaped to conform to the contour of the projections or protuberances of the tire shown in Figures 1 and 2. It will be observed that the parts or portions 6 and 7 are staggered to thus increase the tractive effect of the device when applied in extended transverse relation with respect to the tire tread. A strap 8 is secured at one end to the plate 2 and its other end is adapted to engage with a buckle 9 on the plate 3 in the manner illustrated in Figure 2.

The device is so constructed that the parts or portions 6 and 7 encompass the protuberances or projections 1 as shown in Figure 2 with the intervening parts lying within the spaces between other configurations so that there is but slight projection of the device beyond the surface generated by the extremities of the protuberances.

The portions 6 and 7 of this form of the invention are shown as of coiled wire formation, which encompass certain of the protuberances or projections and when under compression between the tire and the road firmly grip the projections and prevent displacement. The fact that the portions 6 and 7 encompass certain of the projections and that the structure as a whole is attached to the tire by the strap 8 causes the device to remain firmly in place without creepage and at the same time reinforcing the encompassed projections and affording non-skid features.

The tire B shown in Figure 4 has a plurality of projections 10 formed in the nature of truncated pyramids spaced one from another.

The form of the invention illustrated in this figure includes a chain structure adapted to extend throughout the peripheral extent of the tire and includes the usual side chains 11 to which, at intervals, are connected cross links 12. The cross links are provided at intervals with parts 13 shaped to encompass the pyramidal projections 10 in the manner illustrated. The parts 13 of this form of the invention may be made as castings or otherwise fashioned.

Figure 5 illustrates a fragmental portion of a cross chain having two branches 14 and 15 at one end, provided with hooks 16 and 17 respectively to engage side chains such as side chains 11. A cross member 18 is provided with an enlarged part 19 shaped to encompass a protuberance or projection on a tire, and to this part is connected a hook 20 for receiving a similar hook of a companion part so that when the parts are in place, a cross link is provided with a plurality of the portions 19 encompassing several of the protuberances of the tire tread. The form of the invention illustrated in Figure 6 includes a cross chain 21 having branches 22, 23 at one end and branches 24 and 25 at the other end adapted to engage side chains such as the side chains 11 to secure the same in place. Cross link 21 is provided with a part 26 shaped to encompass the projection or protuberance of a tire tread in a manner to reinforce or armor the projection and add anti-skid qualities to the tire. The balance of the chain structure is designed to lie within spaces between other projections or protuberances in the manner illustrated in Figure 2. It is to be understood that the parts 19 and 26, shown in Figures 5 and 6, might of course be constructed of coiled wire formation.

Figure 7 illustrates a cross chain part 27 shaped to surround a substantially cylindrical protuberance or projection and is provided with ears 28 for connecting it to a suitable cross chain.

Figure 8 illustrates a part 29 shaped to fit about a substantially square protuberance or projection and is provided with ears or lugs 30 for connecting it to a cross chain.

In like manner the part 31 shown in Figure 9 is shaped to encompass a hexagonal stud or projection and is provided with lugs or ears 32 for connecting it in place in a cross link.

It is the contemplation of the present invention that the parts of the cross chains or linkage, which engage the projections or protuberances of the tire, loosely engage such projections or protuberances to enable ready application of the cross chains to a tire. Because of the fact that such projections or protuberances are of rubber or rubber composition, the same will be compressed when encountering a road surface, which compression deforms the projections laterally thus serving to increase the holding engagement between the chain parts and the protuberances to protect the protuberances against bending or breakage and to facilitate cooperation between the projections and the chain part for improving tractive conditions.

The invention has been described herein more or less in detail, yet it is to be understood that the invention is not to be limited thereby as changes may be made in the arrangement and proportion of parts and equivalents may be substituted, without departing from the spirit and scope of the invention.

The invention is claimed as follows:

1. In combination with a studded tire, a skid chain having a cross chain provided with members for loosely surrounding certain of the tire studs, said stud surrounding members leaving the ends of said studs uncovered, said cross chain members being so arranged that the stud surrounding members of any two adjacent cross chains are out of circumferential and transverse register with one another.

2. In combination with a studded tire, a member comprising a metallic coil adapted to loosely fit about a stud, linkage connected to said member, and means connected to said linkage to hold said member in place on said stud.

3. In combination with a studded tire, a tire chain including a pair of parallel chains adapted to extend across the tire tread, each chain including a part adapted to fit loosely about transversely spaced studs, the stud engaging part of one chain being out of transverse and circumferential register with the stud engaging part of the other chain, said stud engaging part fitting about said studs without covering the exposed ends of the studs, and means for holding said chain in position on said tire, said stud engaging parts being capable of limited endwise compression as the encompassed studs contact a road surface incidental to the travel of the tire.

4. An anti-skid device for a studded tire comprising a single piece of wire fashioned to provide a stud encompassing part and oppositely disposed attaching lugs, said stud engaging part consisting of several turns of wire to provide endwise compressibility under vehicle load as the part encounters a road surface incidental to tire travel, links connected to said lugs, and means connected to said links to hold said part in place about a stud.

GEORGE D. STORRS.